United States Patent
Bech

(10) Patent No.: US 12,429,031 B1
(45) Date of Patent: Sep. 30, 2025

(54) EQUIPOTENTIAL BONDING OF WIND TURBINE ROTOR BLADE

(71) Applicant: Vestas Wind Systems A/S, Aarhus N. (DK)

(72) Inventor: Anton Bech, Ciudad Real (ES)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/866,316

(22) PCT Filed: May 16, 2023

(86) PCT No.: PCT/DK2023/050120
§ 371 (c)(1),
(2) Date: Nov. 15, 2024

(87) PCT Pub. No.: WO2023/222172
PCT Pub. Date: Nov. 23, 2023

(30) Foreign Application Priority Data

May 17, 2022 (DK) .................................. 202270259

(51) Int. Cl.
*F03D 80/30* (2016.01)
*F03D 1/06* (2006.01)

(52) U.S. Cl.
CPC ......... *F03D 80/301* (2023.08); *F03D 1/0681* (2023.08); *F05B 2230/23* (2013.01); *F05B 2240/30* (2013.01); *F05B 2280/6003* (2013.01)

(58) Field of Classification Search
CPC .... F03D 1/0675; F03D 1/0681; F03D 1/0682; F03D 80/30; F03D 80/301; F05B 2230/23; F05B 2240/30; F05B 2280/6003
See application file for complete search history.

(56) References Cited

U.S. PATENT DOCUMENTS 10,066,599 B2 * 9/2018 Ohlerich ............ B29D 99/0028
12,023,878 B2 * 7/2024 Christiansen ......... B29C 70/885
(Continued)

FOREIGN PATENT DOCUMENTS

EP 3943745 A1 1/2022
EP 3884152 B1 9/2022
(Continued)

OTHER PUBLICATIONS

Danish Patent and Trademark Office, technical examination issued in corresponding DK Application No. PA 2022 70259, dated Nov. 15, 2022.
(Continued)

*Primary Examiner* — Sang K Kim
(74) *Attorney, Agent, or Firm* — Wood Herron & Evans LLP

(57) ABSTRACT

A wind turbine rotor blade portion has a root end, a tip end and a blade shell that defines a suction side, pressure side, leading edge, and a trailing edge of the blade portion. The blade shell includes a lightning conductor including a first conductive material, and at least one spar cap associated with the blade shell and including a second conductive material different than the first conductive material. An equipotential bonding element electrically bonds the lightning conductor to the spar cap. The equipotential bonding element includes a first end portion having a first metallic material adjacent the first conductive material of the lightning conductor, a second end portion opposite the first end portion and having a second metallic material adjacent the second conductive material of the spar cap, and an intermediate portion where the first metallic material is joined to the second metallic material at a joint and having an insulator encapsulating the joint for preventing exposure of the joint to an electrolyte material.

16 Claims, 7 Drawing Sheets

(56) References Cited

U.S. PATENT DOCUMENTS

| | | | |
|---|---|---|---|
| 12,129,832 B2 * | 10/2024 | Hansen | F03D 80/30 |
| 2012/0020791 A1 | 1/2012 | Flemming et al. | |
| 2020/0408190 A1 | 12/2020 | García Ayerra et al. | |
| 2021/0404443 A1 | 12/2021 | Thwaites et al. | |
| 2022/0003215 A1 | 1/2022 | Thwaites et al. | |
| 2022/0018328 A1 | 1/2022 | Bendel | |
| 2023/0003186 A1 * | 1/2023 | Lykkegaard | F03D 80/30 |

FOREIGN PATENT DOCUMENTS

| | | | | |
|---|---|---|---|---|
| EP | 4379206 A1 * | 6/2024 | | B29D 99/0028 |
| WO | 2013/087078 A1 | 6/2013 | | |
| WO | 2021/110225 A1 | 6/2021 | | |

OTHER PUBLICATIONS

International Searching Authority, International Search Report and Written Opinion issued in corresponding PCT Application No. PCT/DK2023/050120, dated Aug. 3, 2023.

* cited by examiner

Section A-A

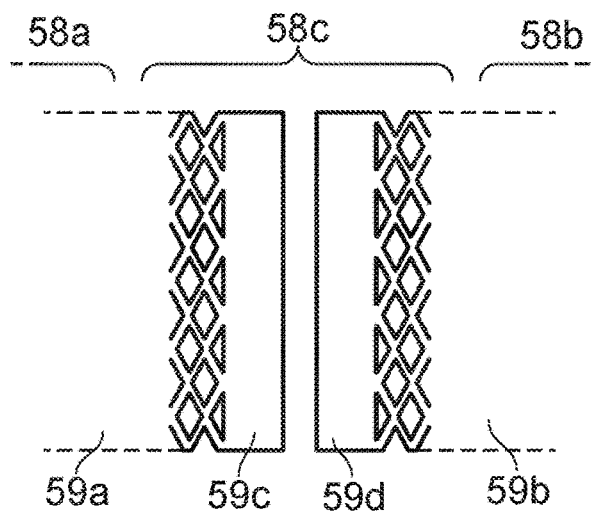
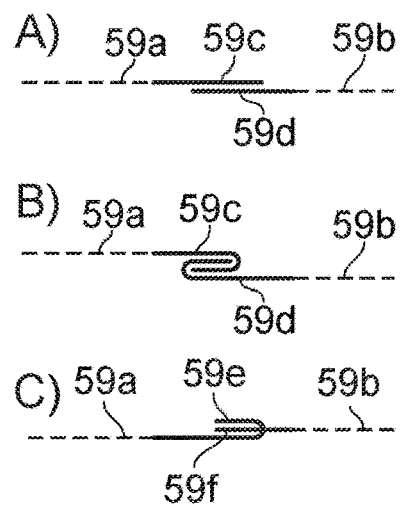
FIG. 11
FIG. 12
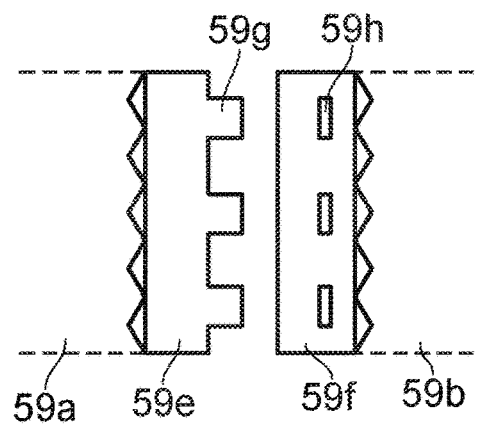
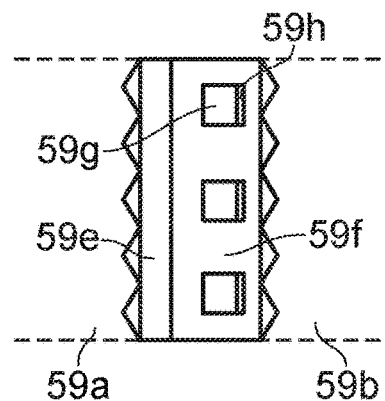
FIG. 13
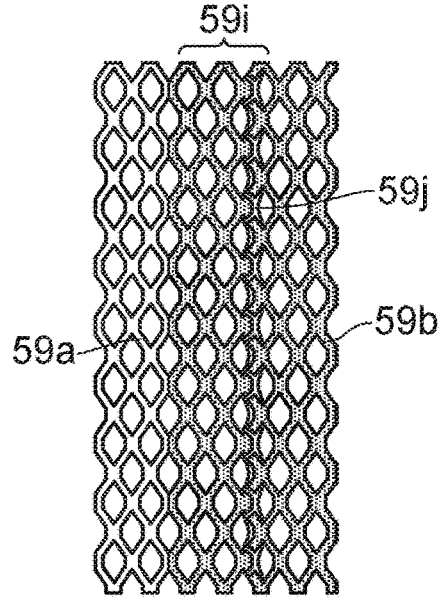
FIG. 14

EQUIPOTENTIAL BONDING OF WIND TURBINE ROTOR BLADE

The present invention relates to a wind turbine rotor blade, and in particular to equipotential bonding within the wind turbine rotor blade, and to a method of manufacturing a wind turbine rotor blade.

BACKGROUND OF THE INVENTION

A wind turbine converts kinetic energy of the wind into electrical energy. A generator converts the wind energy captured by a rotor having one or more rotor blades into electrical energy that is usually supplied to a utility grid. The generator is housed in a nacelle together with the various components required to operate and optimize the performance of the wind turbine. A tower supports the load presented by the nacelle and the rotor. In a horizontal axis wind turbine (HAWT) the rotor blades extend radially outwardly from a central hub which rotates about a longitudinal axis aligned generally horizontally. In operation, the blades are configured to interact with the passing air flow to produce lift that causes the rotor to rotate within a plane substantially perpendicular to the direction of the wind.

A conventional rotor blade is made from an outer shell and a spar structure. The spar structure serves to transfer loads from the rotating blade to the hub of the wind turbine. Such loads include tensile and compressive loads directed along the length of the blade arising from the circular motion of the blade and loads arising from the wind which are directed along the thickness of the blade, i.e. from the windward side of the blade to the leeward side. The spar structure comprises one or more shear webs extending between spar caps. The spar caps may be incorporated into the outer shell or may be attached to the outer shell.

The spar cap may include pultruded fibrous strips of material. Pultrusion is a continuous process similar to extrusion, wherein fibres are pulled through a supply of liquid resin and then heated so the resin is cured. The resulting cured fibrous material is of constant cross section but, since the process is continuous, the material once formed may be cut to any arbitrary length.

WO 2013/087078 describes a wind turbine blade with an elongate reinforcing structure comprising a stack of pultruded fibrous composite strips. The pultruded fibres are carbon fibres and extend almost the full length of the blade from root to tip.

Wind turbines are susceptible to lightning strikes. It is common for a wind turbine to include a lighting protection system, which electrically couples the wind turbine components to the ground. The blades may include a metallic foil, or surface protection layer (SPL), incorporated into the outer shell near the outer surface of the blade. The metallic foil may cover only a portion or substantially the entire blade outer surface. The metallic foil is electrically connected through the tower and nacelle to ground.

Although lightning strikes have a natural tendency, due to their high frequency, to follow along the outside surface of a structure, such as the rotor blade, the presence of conductive fibres in the blade shell may cause unwanted discharges when a lightning strike occurs that could cause damage to the blade shell. This problem may be exacerbated where the conductive fibres are continuous and extend along a substantial length of the rotor blade, especially for a long blade.

SUMMARY OF THE INVENTION

A first aspect of the invention provides a wind turbine rotor blade portion having a root end and a tip end, comprising: a wind turbine blade shell that defines a suction side, pressure side, leading edge, and a trailing edge of the blade portion, wherein the blade shell includes a lightning conductor including a first conductive material; and at least one spar cap associated with the blade shell and including a second conductive material different than the first conductive material; an equipotential bonding element electrically bonding the lightning conductor to the spar cap, wherein the equipotential bonding element includes: a first end portion having a first metallic material adjacent the first conductive material of the lightning conductor, a second end portion opposite the first end portion and having a second metallic material adjacent the second conductive material of the spar cap, and an intermediate portion where the first metallic material is joined to the second metallic material at a joint and having an insulator encapsulating the joint for preventing exposure of the joint to an electrolyte material.

A further aspect of the invention provides a method of manufacturing a wind turbine rotor blade portion having a root end and a tip end, comprising: laying up a shell of a wind turbine rotor blade that defines a suction side, pressure side, leading edge, and a trailing edge of the blade portion, the shell including a lightning conductor including a first conductive material; laying up a spar cap such that the lightning conductor extends over the spar cap, wherein the spar cap includes a second conductive material; and providing an equipotential bonding element to electrically bond the lightning conductor to the spar cap, the equipotential bonding element including: a first end portion having a first metallic material adjacent the first conductive material of the lightning conductor, a second end portion opposite the first end portion and having a second metallic material adjacent the second conductive material of the spar cap, and an intermediate portion where the first metallic material is joined to the second metallic material at a joint and having an insulator encapsulating the joint for preventing exposure of the joint to an electrolyte material.

By preventing exposure of the joint to an electrolyte material, it becomes possible to prevent an electric current path from forming between the first metallic material and the second metallic material other than via the joint. Avoiding such a current path, or arc, helps to prevent galvanic corrosion of the first or second metallic materials where these are dissimilar metals, e.g. two metallic materials which are far away from each other in their standard electrode potentials, such as copper and aluminium. Use of dissimilar metallic materials may be preferable in order to prevent galvanic corrosion between i) the first conductive material of the lightning conductor and the first metallic material of the equipotential bonding element, and ii) between the second conductive material of the spar cap and the second metallic material of the equipotential bonding element.

The presence of electrolyte material in the vicinity of the equipotential bonding element may be unavoidable within the blade shell, e.g. ionised water from the natural environment when the wind turbine rotor blade portion is in normal operation as part of a wind turbine.

Preferably, the insulator covers only a small proportion of the equipotential bonding element. The insulator may extend either side of the joint a sufficient distance to prevent an electric current path from forming between the first metallic material and the second metallic material other than via the joint.

The first metallic material and the second metallic material may be mechanically and electrically joined together at the joint.

The equipotential bonding element may be formed as a strip or ribbon.

The first metallic material and the second metallic material may each have a form configured to accommodate, without yielding, observed strains greater than the yield strength of a solid, straight form of the respective materials.

The first metallic material may have a different form to the second metallic material.

The first metallic material and/or the second metallic material may be formed as apertured foil or mesh.

An aspect ratio of the apertures of the first metallic material may be different than an aspect ratio of the apertures of the second metallic material.

The first metallic material and/or the second metallic material may be formed as strands on a substrate.

The strands may have an undulating form with undulations in a plane parallel to the substrate. Preferably, a pitch of the undulating strands of the first metallic material are different than a pitch of the undulating strands of the second metallic material.

The blade shell may include a plurality of stacks of fibre plies. The equipotential bonding element may extend between an edge of one stack and an edge of an adjacent stack which overlap to define an overlapping edge region extending across the spar cap.

The intermediate portion of the equipotential bonding element may be in the overlapping region away from the spar cap and the lightning conductor.

Each stack of fibre plies may have an inboard edge towards the root end of the blade, an outboard edge towards the tip end of the blade, a forward edge towards the leading edge of the blade, and a rear edge towards the trailing edge of the blade. The equipotential bonding element may extend between an outboard edge of one stack and an inboard edge of an adjacent stack which overlap.

The first end portion of the equipotential bonding element may be attached to and in electrical contact with the lightning conductor. The second end portion of the equipotential bonding element may be attached to and in electrical contact with the spar cap.

The spar cap may have an outer side, and an inner side nearest an interior of the blade, and the equipotential bonding element may be attached to and in electrical contact with the outer side of the spar cap.

The spar cap may include a stack of layers of the second conductive material, preferably carbon fibre material, preferably pultruded carbon fibre composite material.

The first metallic material may have a standard electrode potential similar to that of the first conductive material of the lightning conductor, and the second metallic material may have a standard electrode potential similar to that of the second conductive material of the spar cap. The standard electrode potentials may be similar so that galvanic corrosion may be minimal even in the presence of an electrolyte. In this context, 'similar' may mean that the standard electrode potentials (E°), relative to the standard electrode potential of Hydrogen, are of the same order of magnitude.

The overlapping edges of the adjacent stacks of fibre plies may be formed by consecutively terminating individual layers in the stack to form a staircase or ramp.

The lightning conductor may be a metallic foil of a lightning protection system.

The lightning conductor may be at or near an outer surface of the blade.

The wind turbine rotor blade may further comprise a plurality of the equipotential bonding elements.

BRIEF DESCRIPTION OF THE DRAWINGS

Embodiments of the invention will now be described with reference to the accompanying drawings, in which:

FIG. 4b shows a detail view of the outer shell, spar cap and shear web at B in FIG. 4a;

FIG. 11 shows ends of the two metallic materials in the equipotential bonding element;

FIGS. 12 A) to C) show various joints between the two metallic materials in the equipotential bonding element;

FIGS. 13 A) and B) show a further joint between the two metallic materials in the equipotential bonding element;

FIG. 14 shows a yet further joint between the two metallic materials in the equipotential bonding element.

DETAILED DESCRIPTION OF EMBODIMENT(S)

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the spar caps may form part of the load bearing structure extending in the longitudinal direction that carries the flapwise bending loads of the blade.

The term shear web is used to refer to a longitudinal, generally spanwise extending, reinforcing member of the blade that can transfer load from one of the windward and leeward sides of the blade to the other of the windward and leeward sides of the blade.

Figure 1:
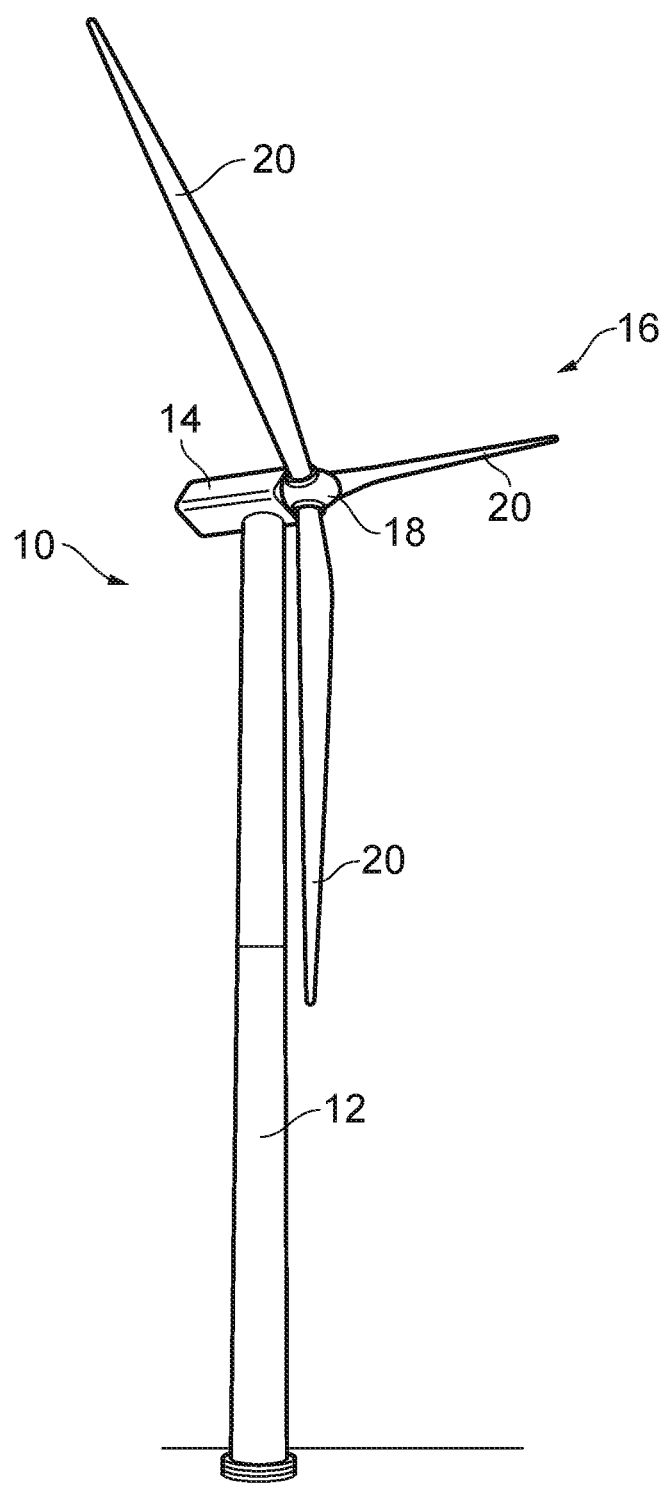
FIG. 1 shows a wind turbine.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled via a gearbox to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAWT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
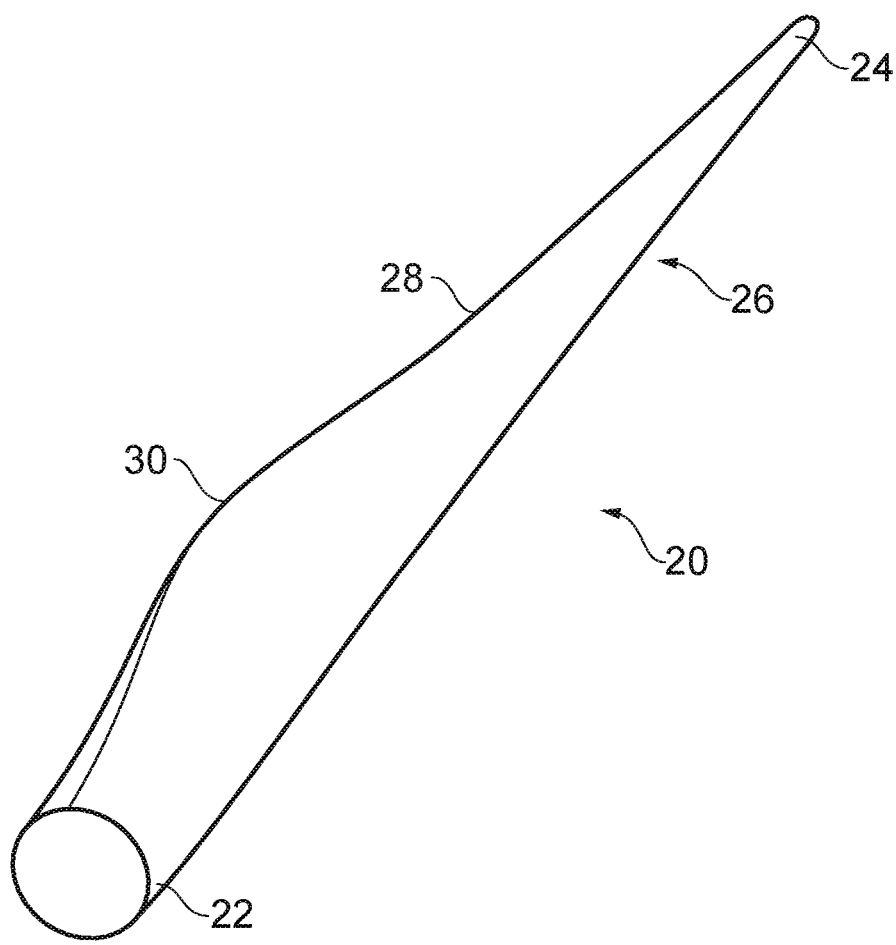
FIG. 2 shows a wind turbine blade.

FIG. 2 illustrates one of the wind turbine blades 20 for use in such a wind turbine. Each of the blades 20 has a root end 22 proximal to the hub 18 and a tip end 24 distal from the hub 18. A leading edge 26 and a trailing edge 28 extend between the root end 22 and tip end 24, and each of the blades 20 has a respective aerodynamic high pressure surface (i.e. the pressure surface) and an aerodynamic low pressure surface (i.e. the suction surface) extending between the leading and trailing edges of the blade 20. The pressure surface is on a pressure side of the blade and the suction surface is on a suction side of the blade. The blade may be split in the spanwise direction to form a segmented blade comprising a plurality of blade portions each having a root and a tip, alternatively the blade may be continuous from the root end 22 to the tip end 24 forming one blade portion.

Each blade has a cross section which is substantially circular near the root end 22, because the blade near the root must have sufficient structural strength to support the blade outboard of that section and to transfer loads into the hub 18. The blade 20 transitions from a circular profile to an aerofoil profile moving from the root end 28 of the blade towards a "shoulder" 30 of the blade, which is the widest part of the blade where the blade has its maximum chord. The blade 20 has an aerofoil profile of progressively decreasing thickness in an outboard portion of the blade, which extends from the shoulder 30 to the tip end 24.

Figure 3:
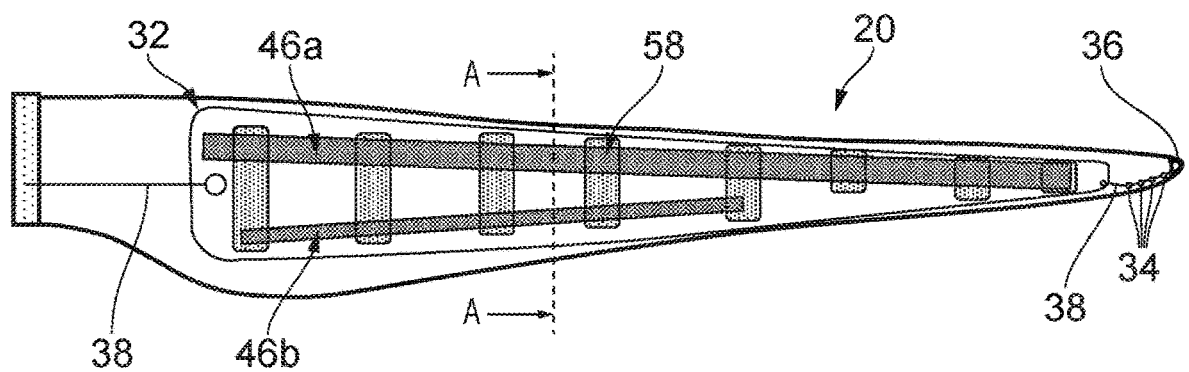
FIG. 3 shows a schematic plan view of a wind turbine blade with lightning protection features.

As shown schematically in FIG. 3, the blade 20 includes one or more lightning receptors and one or more lightning 'down conductors' which form part of a lightning protection system for the wind turbine. The lightning receptors attract the lightning strike and the down conductors conduct the energy of the lightning strike down the blade 20 via the nacelle 14 and tower 12 to a ground potential. The lightning conductor may take a variety of forms, such as a surface metallic foil 32 on the outer surface of the blade and/or a cable 38, e.g. running through the interior of the hollow blade. The lightning conductor includes a first conductive material. The lightning receptors may include the metallic foil 32 and/or discrete lightning receptors 34 installed on the outer surface of the blade, or a solid metal tip 36 or metal coated laminate (e.g. a copper cap) may be provided conformal with the shape of the blade nearest the tip end 24, for example. The discrete lightning receptors 34 and metal tip 36 may be electrically connected to the lightning conductor (s).

The majority of the outer surface of the blade 20 may be covered with the metal foil 32. The metal foil 32 may act as either a lightning receptor, a down conductor, or both. The down conductor may extend substantially the full length of the blade. Where the majority of the outer surface of the blade 20 is covered with the metal foil 32 the cable 38 may connect to the metal foil 32 adjacent the tip end 24 of the blade and adjacent the root end 22 of the blade, with no cable 38 along the majority of the length of the blade covered with the metal foil 32. The metal foil 32 may extend from root to tip in which case there may be no need for cable 38. The metal foil 32 may extend in sections along the length of the blade with cable sections between the metal foil sections. Cable 38 may alternatively extend under the metal foil 32 (inside the blade) so that the cable 38 and metal foil 32 are electrically connected in parallel. Alternatively the blade may have a larger number of the discrete lightning receptors on the blade surface, electrically connected via a down conductor cable that runs substantially the full length of the blade, instead of having the metal foil.

At the root end 22 of the blade 20, the down conductor 38 may be electrically connected via an armature arrangement to a charge transfer route via the nacelle 14 or hub 18 and tower 12 to a ground potential. Such a lightning protection system therefore allows lightning to be channeled from the blade to a ground potential safely, thereby minimising the risk of damage to the wind turbine 10.

Figure 4A:
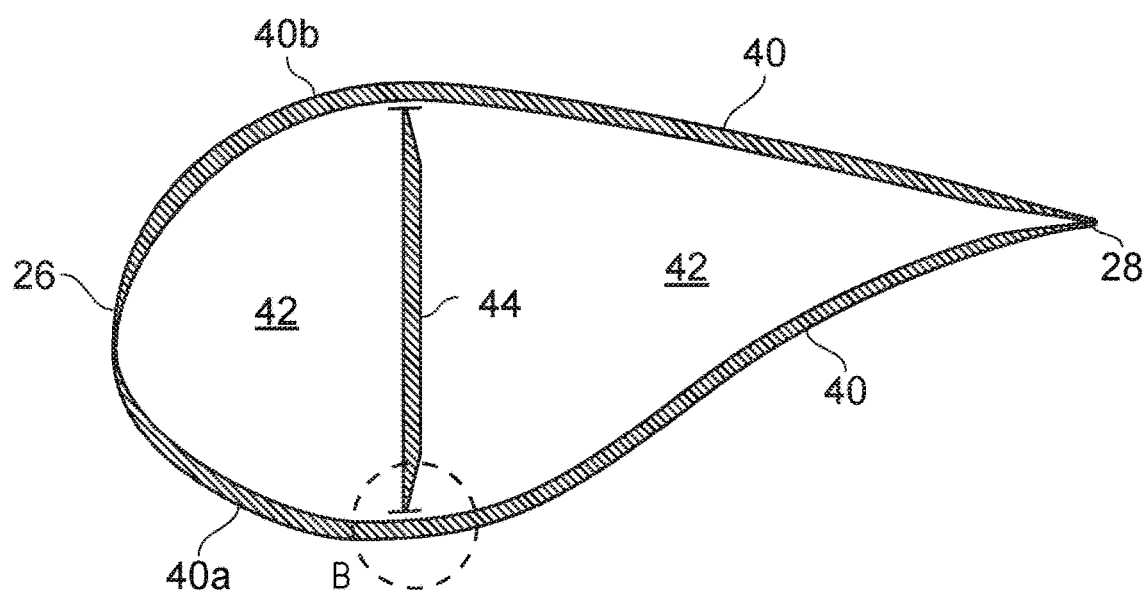
FIG. 4a shows a section view of the hollow blade along A-A in FIG. 3.

As shown in FIG. 4a, the wind turbine blade 20 includes an outer blade shell 40 defining a hollow interior space 42 with a shear web 44 extending internally between upper and lower parts of the blade shell 40. The blade shell 40 may comprise two half-shells 40a, 40b which are separately moulded before being joined together (at the leading edge 26 and the trailing edge 28) to form the blade 20. It will be appreciated that the blade shell 40 need not be formed as two half-shells which are subsequently joined together but may be formed as a unitary shell structure, together with the shear web 42, in a "one shot" single shell process.

Figure 4B:
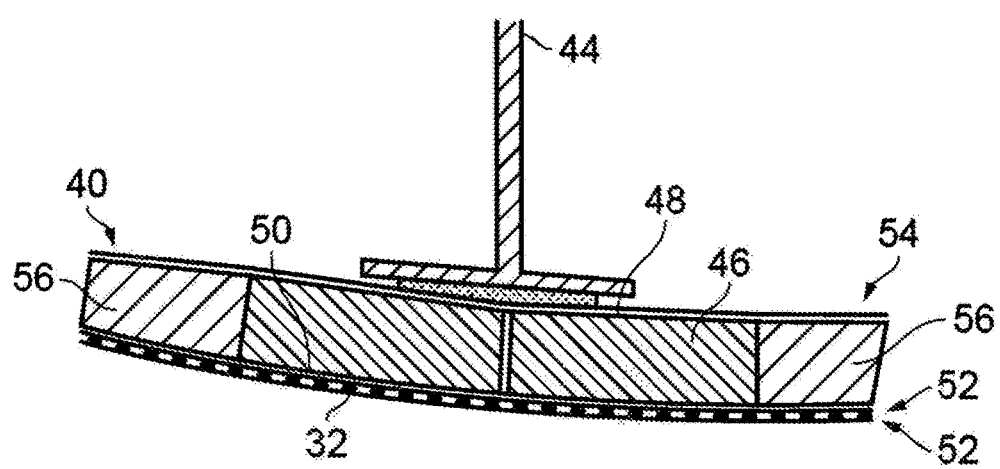

FIG. 4b shows a detail view of the region where the shear web 44 meets the blade shell 40. A spar cap 46 may be incorporated into the outer shell 40, as shown in FIG. 4b, or may be attached to the outer shell 40. The spar cap 46 is an elongate reinforcing structure extending substantially along the full length of the blade 20 from the root end 22 to the tip end 24. The spar cap 46 includes second conductive material, such as carbon fibres. For example, the spar cap may include pultruded fibrous strips of material such as pultruded carbon fibre composite material or other carbon fibre reinforced polymer material.

Returning to FIG. 3, the blade 20 may have more than one spar cap 46 incorporated in, or attached to, the upper and lower parts of the blade shell 40. In the illustrated example, the blade 20 has main spar caps 46a with the shear web 44 extending between, and rear spar caps 46b (also known as stringers) which may or may not have a shear web extending between.

Each spar cap 46 may include a stack of layers of the second conductive material. The shear web 44 may be adhesively bonded to an inner surface 48 of the spar cap 46. An outer surface 50 of the spar cap 46 may sit adjacent the lightning conductor in the outer surface of the blade shell 40. As shown in FIG. 4b, the lightning conductor may be in the form of the metal foil 32 which is separated from the outer surface 50 of the spar cap 46 by one or more layers of insulating material 52, such as glass fibre reinforced polymer. One or more further layers 52 of glass fibre reinforced polymer may be provided over the outside of the metallic foil 32. The layers 52 collectively form an outer skin of the blade shell 40. One or more further layers of glass fibre reinforced polymer provide an inner skin 54 of the blade shell 40 with a core material 56 between the outer skin 52 and the inner skin 54. The core material may be a light structural foam, though other core materials such as wood, particularly balsa wood, may alternatively be used to provide a lightweight core material. It will be appreciated that a near identical connection is made between the shear web 44 and the other side of the blade shell 40.

Figure 5:
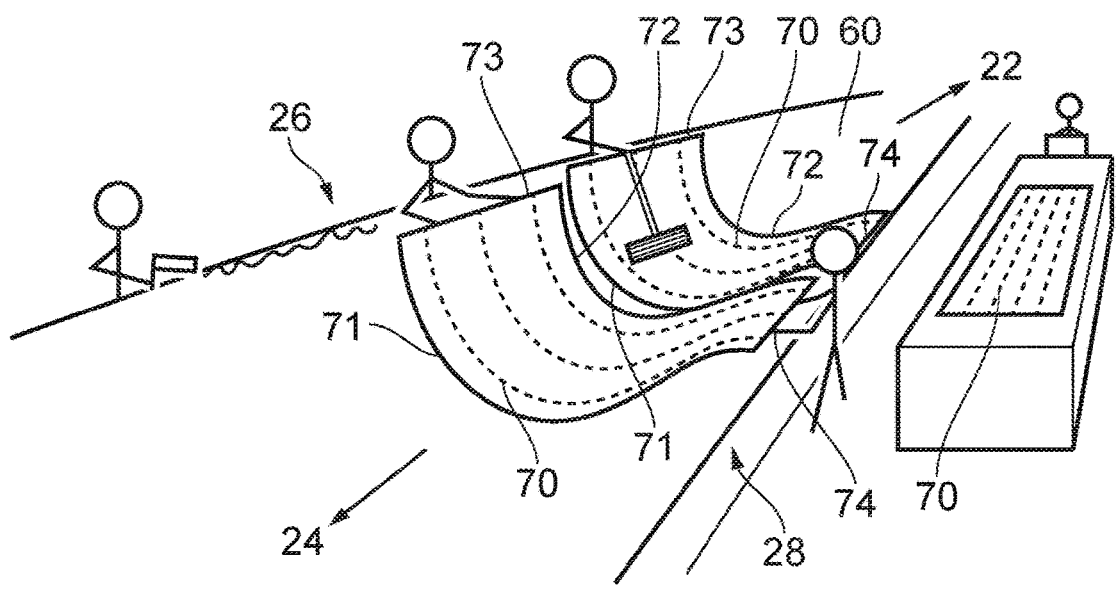
FIG. 5 shows a schematic of chordwise layup of the outer shell in a mould.
Figure 6:
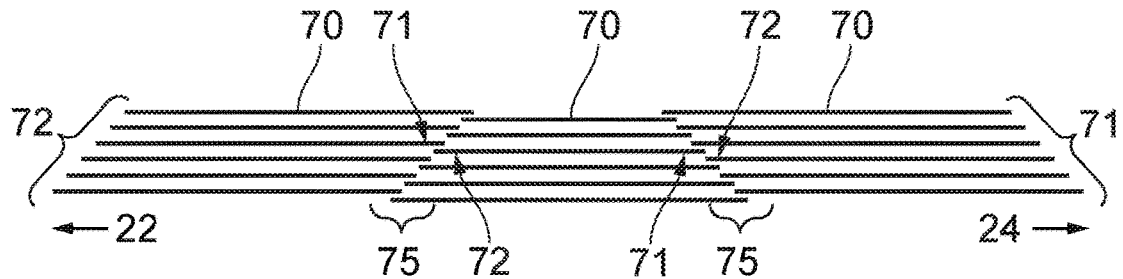
FIG. 6 shows a schematic spanwise section of the stacks of plies of the outer shell, showing the overlapping edges of the stacks of plies.

The structure of the blade shell 40, and in particular the outer skin, and its method of manufacture will now be described in detail. As shown in FIG. 5, the layers 52 of glass fibre reinforced fabric are laid up in a mould 60 as stacks of fibre plies 70. The stack of fibre plies 70 may include a plurality of fibre plies stitched or otherwise attached together as a kit. The stacks of fibre plies 70 may be pre-cut to fit the shape of the mould 60 such that the stacks of fibre plies 70 readily conform to the shape of the mould 60 and a number of plies may be laid up in the mould 60 easily and in a short time, preferably without the need for any cutting or detailed shaping of the plies once in the mould 60. Alternatively the plies may be cut in the mould 60. The stacks of fibre plies 70 may include dry fibres to be subsequently infused with resin or alternatively the fibre plies may be wet or semi-dry fibre plies, requiring no or only partial infusion of resin prior to consolidation and cure within the mould 60. The stack of fibre plies 70 may alternatively be laid up ply-by-ply in the mould 60. The stacks of fibre plies 70 may be prepared out of the mould 60 on a flat or near flat surface outside the mould such that the stack of fibre plies 70 assume their form or shape upon being laid up in the mould 60. Alternatively the stack of fibre plies 70 may be laid up on a suitably shaped surface outside the mould such that the stack of fibre plies 70 assume their (near final) form or shape outside the mould before being laid up in the mould 60. In the following the stacks of fibre plies, laid up outside the mould on any surface, are referred to as "preforms".

The stacks of fibre plies 70 may each have an inboard edge 71 towards the root end 22 of the blade 20, an outboard edge 72 towards the tip end 24 of the blade, a forward edge 73 towards the leading edge 26 of the blade, and a rear edge 74 towards the trailing edge 28 of the blade.

The stacks of fibre plies 70 are arranged such that an inboard edge 71 of one of the stacks 70 and an outboard edge 72 of an adjacent stack 70 overlap to define an overlapping region 75 extending generally transverse across the location of the spar cap 46. This is generally known as a "chordwise layup" of the preforms or stacks of fibre plies 70. Each of the stacks of fibre plies 70 may extend across the full chordwise width of the mould 60 such that the forward edge 73 of each stack of fibre plies 70 is at the leading edge 26 of the blade, and the rear edge 74 of each stack of fibre plies 70 is at the trailing edge 28 of the blade. Typically, the length of each stack of fibre plies 70 between the forward edge 73 and the rearward edge 74 is greater than the width of the stack between the inboard edge 71 and the outboard edge 72. Note that this "chordwise layup" does not relate to any fibre direction of any of the plies that make up the stacks of fibre plies 70, and any individual ply may have a fibre direction.

Figure 7:
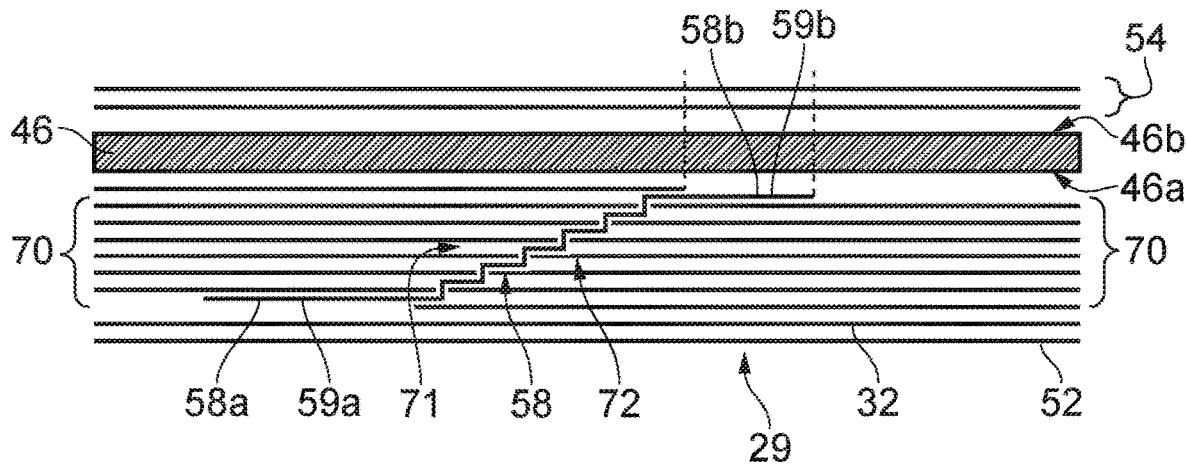
FIG. 7 shows a schematic spanwise section of an adjacent pair of stacks of plies of the outer shell, with the equipotential bonding element extending from the surface protection layer to the spar cap through the overlapping edges of the stacks of plies.

In order to avoid the risk of arcing between the second conductive material of the spar cap 46 and the first conductive material of the metal foil 32 or other lightning conductor, an equipotential bonding element 58 is used to equipotentially bond the lightning conductor to the second conductive material of the spar cap 46, as shown in FIG. 7. By electrically bonding the lightning conductor 32 to the spar cap 46, the spar cap 46 may be held at the same potential as the lightning conductor such that in the event of a lightning strike undesirable discharges or arcs between the lightning conductor 32 and the spar cap 46 can be avoided.

The overlapping edges of the adjacent stacks of fibre plies 70 may be formed by consecutively terminating individual plies in the stack to form a staircase or ramp. Advantageously, this consecutive termination of the individual plies in the stacks at the overlapping region 75 may create a stepwise path between the outboard edge 72 of one stack 70 and an inboard edge 71 of an adjacent stack 70 and through which the equipotential bonding element 58 may extend so as to electrically bond the metallic foil 32, or other lightning conductor, to the spar cap 46.

The second conductive material of the spar cap 46 may be different than the first conductive material of the lightning conductor 32. For example, as mentioned above, the spar cap 46 may include carbon fibres which act as the second conductive material. By contrast the metal foil of the lightning conductor 32 may commonly be a metal mesh or expanded metal foil made of, for example, aluminium. Carbon and aluminium have very different standard electrode potentials. For example, carbon (graphite, in solution) has a standard electrode potential relative to the standard hydrogen electrode of +0.13 V, whereas aluminium has a standard electrode potential relative to the standard hydrogen electrode of −2.31 V. The aluminium of the first conductive material may be remote from the carbon of the second conductive material, as shown in the example arrangement of FIG. 7, and so the risk of galvanic corrosion is not great due to the relatively large physical distance between these two materials even in the presence of an electrolyte material.

Figure 8:
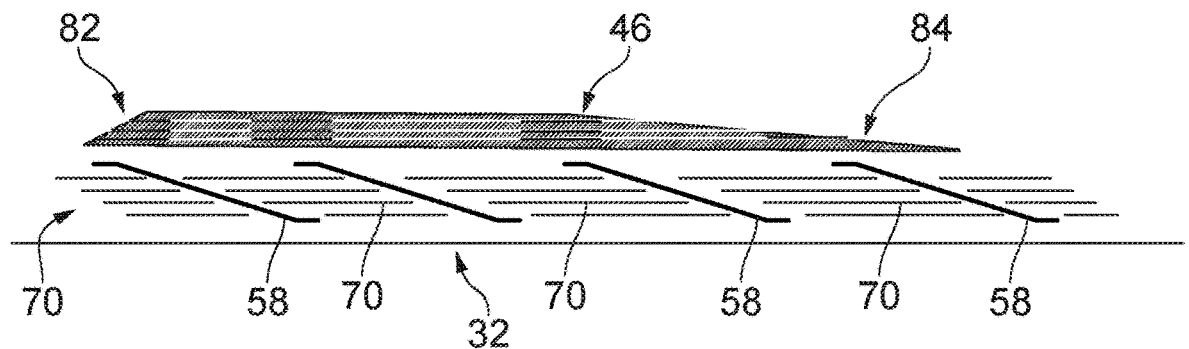
FIG. 8 shows an example wherein the equipotential bonding elements are laid up between the stacks of plies.
Figure 9:
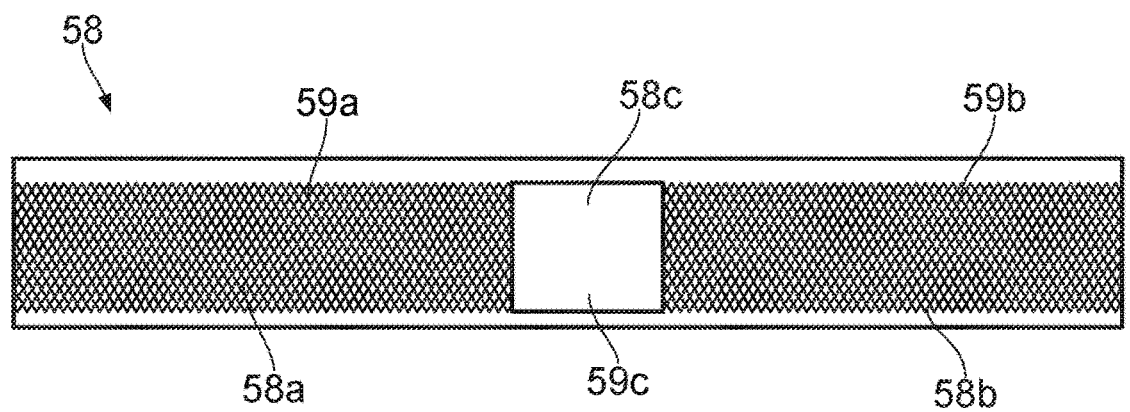
FIG. 9 shows a bimetallic equipotential bonding element.

However, the equipotential bonding element 58 is used to equipotentially bond the first conductive material of the lightning conductor 32 to the second conductive material of the spar cap 46. As shown in FIGS. 7 to 9, the equipotential bonding element 58 has a first end portion 58a adjacent the first conductive material of the lightning conductor e.g. metallic foil 32, a second end portion 58b opposite the first end portion and adjacent the second conductive material of the spar cap 46, and an intermediate portion 58c. The first end portion 58a has a first metallic material 59a, and the second end portion 58b has a second metallic material 59b.

By providing the equipotential bonding element 58 as a bimetallic component, it becomes possible to closely match the standard electrode potentials of the first conductive material of the lightning conductor 32 and the first metallic material of the equipotential bonding element 58, which are adjacent; and to closely match the standard electrode potentials of the second conductive material of the spar cap 46 and the second metallic material of the equipotential bonding element 58, which are also adjacent.

The first metallic material may have a standard electrode potential similar to that of the first conductive material of the lightning conductor, and the second metallic material may have a standard electrode potential similar to that of the second conductive material of the spar cap. The standard electrode potentials may be similar so that galvanic corrosion may be minimal even in the presence of an electrolyte. In this context, 'similar' may mean that the standard electrode potentials (E0), relative to the standard electrode potential of Hydrogen, are of the same order of magnitude.

Referring to the above example, where the first conductive material is aluminium and the second conductive material is carbon, the first metallic material of the equipotential bonding element 58 may be aluminium and the second metallic material may be copper. Where the first conductive material and the first metallic material are both aluminium, the standard electrode potentials of these two conductive materials may be substantially identically matched and there should be no issue of galvanic corrosion where these two components are adjacent. Where the second conductive material is carbon and the second metallic material is copper, the standard electrode potentials of these two conductive materials may be similar but not identical. For example, carbon has a standard electrode potential relative to the standard hydrogen electrode of +0.13 V, whereas copper has a standard electrode potential relative to the standard hydrogen electrode of +0.1 V. Whilst these values are not identical they are of the same order of magnitude and so the risk of galvanic corrosion where these materials are adjacent is significantly reduced, to the extent that any galvanic corrosion can be safely ignored through the working life of the components.

Although the equipotential bonding element 58 may be formed as a bimetallic component, this shifts the problem of galvanic corrosion away from the end portions 58a and 58b of the equipotential bonding element adjacent the first and second conductive materials, to the intermediate portion 58c of the equipotential bonding element 58. In order to function as an equipotential bonding element to equipotentially bond the first conductive material of the lightning conductor 32 to the second conductive material of the spar cap 46, the first metallic material is joined to the second metallic material at a joint within the intermediate portion 58c. As shown in FIG. 9, an insulator 59c encapsulates the joint for preventing exposure of the joint to an electrolyte material.

The presence of electrolyte material in the vicinity of the equipotential bonding element 58 may be unavoidable within the blade shell 40, e.g. ionised water from the natural environment when the wind turbine rotor blade 20 or blade portion is in normal operation as part of the wind turbine 10.

By preventing exposure of the joint to an electrolyte material using the insulator 59c, it becomes possible to prevent an electric current path from forming between the first metallic material 59a and the second metallic material 59b other than via the joint. Avoiding such a current path, or arc, helps to prevent galvanic corrosion of the first or second metallic materials in close proximity where these are dissimilar metals, e.g. two metallic materials which are far away from each other in their standard electrode potentials, such as copper and aluminium, as in the example above.

The first metallic material 59a may be attached to and in electrical contact with the first conductive material of the metallic foil 32, or other lightning conductor. The second metallic material 59b may be attached to and in electrical contact with the second conductive material of the spar cap 46. These electrical contacts may be achieved by vacuum pressure on the blade layup prior to resin infusion to form the blade shell. If necessary a conductive fleece may be added to assist with the formation of these electrical contacts.

The insulator 59c may cover only a small proportion of the equipotential bonding element 58. The insulator 59c may extend either side of the joint a sufficient distance to prevent an electric current path from forming between the first metallic material 59a and the second metallic material 59b other than via the joint.

The first metallic material 59a and the second metallic material 59b may be mechanically and electrically joined together in the intermediate portion 58c of the equipotential bonding element 58 and the joint is encapsulated by the insulator 59c.

The equipotential bonding element 58 may be formed as a strip or ribbon. The equipotential bonding element 58 may be generally rectangular prior to installation in the blade shell 40. The equipotential bonding element 58 may be generally thin and flexible. This enables the equipotential bonding element 58 to deform, e.g. in the stepwise manner described above, during manufacture of the blade shell. As shown in FIG. 7, the spar cap 46 has an outer side 46a nearest the outer surface 29 of the blade 20, and an inner side 46b nearest the hollow interior 42 of the blade 20. The second metallic material 59b of the equipotential bonding element 58 may be attached to and in electrical contact with the outer side 46a of the spar cap 46. By "stepping" the flat ribbon between the edges of the adjacent stacks 70 of fibre plies the ribbon is kept as flat as possible.

The first and/or second metallic materials 59a, 59b of the equipotential bonding element 58 may each be formed as a conductive ply such as a sheet of conductive mesh, e.g. a metal mesh or foil; or the first and/or second metallic materials 59a, 59b may comprise strands of electrically conductive material, such as metal wire, woven into a fabric material, such as glass fibre fabric.

The glass fibre material of the stacks of fibre plies 70 between the spar cap 46 and the lightning conductor 32 primarily distributes the mechanical load but the glass fibres also help avoid a galvanic response between the carbon (second conductive material) of the spar cap and the aluminium (first conductive material) of the metal foil 32. Of course, it will be appreciated that the lightning conductor 32 may be formed of other suitable material such as copper, and the choice of the first and second metallic materials 59a, 59b for the equipotential bonding element 58 may be selected according to the other material choices.

The spar cap 46 may be arranged so as to be equipotentially bonded between the layers of conductive material in the spar cap. The spar cap 46 may include a stack comprising a plurality of layers of conductive material. The conductive material may comprise pultruded fibre composite material, for example carbon fibre reinforced polymer. The pultruded fibres may be oriented in a longitudinal direction of the spar cap 46 which is aligned with the longitudinal or spanwise direction of the blade 20. By equipotentially bonding the adjacent layers of the conductive material 80, undesirable discharges or arcs from the spar cap 46 can be avoided in the event of a lightning strike on the blade 20.

The spar cap 46 may extend over substantially the full length of the blade 20 and has a first end 82 nearest the root end 22 of the blade 20 and a second end 84 adjacent the tip end 24 of the blade. The spar cap 46 has a thickness in the stacking direction of the layers of conductive material 80 which may vary along the length of the spar cap 46.

Returning to FIG. 3, it can be seen that the metal foil 32 lightning conductor may extend over substantially the whole of the blade surface. A plurality of equipotential bonding elements 58 may connect to the spar cap 46 at various locations along the length of the blade. In particular, a first one of the equipotential bonding elements 58 may connect to the spar cap 46 at the tip end 84 of the spar cap 46, and a second one of the equipotential bonding elements 58 may connect the metal foil 32 to the first (root) end 82 of the spar cap 46. Further intermediate equipotential bonding elements 58 connect the metal foil 32 lightning conductor to mid-span regions of the spar cap 46, respectively.

With the electrical connections provided by the equipotential bonding elements 58 at both the root end and the tip end of the blade there will be a voltage drop between the first and second ends 82, 84 of the spar cap 46. Depending on the length of the blades 20, and particularly on the length of the longest layer of conductive material 80 in the spar cap 46, the value of the voltage drop between the first and second ends 82, 84 of the spar cap 46 will vary. If this voltage drop is below a threshold value at which flashover from the lightning conductor to one or more of the layers 80 of the conductive material may occur, then the provision of the equipotential bonding elements 58 at only the ends 82, 84 of the spar cap 46 may be sufficient. However, if the voltage drop between the ends 82, 84 of the spar cap 46 is above the threshold then one or more further equipotential bonding elements 58 may be required to electrically bond the metal foil 32 to an intermediate point of the spar cap 46 between the first and second ends 82, 84.

FIG. 9 illustrates an example where both the first and second metallic materials 59a, 59b are formed as apertured foil or mesh.

The join between the first and second metallic materials 59a, 59b is encapsulated by an insulator 59c for preventing exposure of the joint to an electrolyte material. The insulator 59c may have a known dielectric strength. The insulator may be a polymer. The polymer can preferably be a thermoplastic material. The thermoplastic material may have a high surface tension, so the resin infusion to the neighbouring stacks of fibre plies 70 can adhere to the polymer. The polymer may be polyethylene (PE), or polyester terephthalate (PET), or other suitable polymers. The polymer may be corona treated on the outer surface for improved adhesion to the resin infusion, e.g. epoxy resin.

The mesh strips of the first and second metallic materials 59a, 59b may be approximately 50 mm wide. The insulator 59c may form an encapsulation region having an area of approximately 60×60 mm and approximately 2 mm thick.

The encapsulated region of the equipotential bonding element 58 may be located between glass fibre fabric layers of the stacks of fibre plies 70 and not in direct contact with the first or second conductive materials of the lightning conductor 32 and spar cap 46. The insulator 59c preferably covers only a relatively small proportion of the length of the equipotential bonding element 58.

As discussed above, the first and second metallic materials 59a, 59b are dissimilar metals, e.g. copper and aluminium. When dissimilar metals are used for the first and second metallic materials 59a, 59b of the equipotential bonding element 58 then it is likely that each different metallic material will have a different yield strength. It is important to consider the yield strength of these materials as the blade shell may experience significant flapwise bending deflection in use, i.e. bending of the blade in the spanwise direction out of the rotor plane. The strains which act in blades needs to be accommodated to prevent deterioration due strain hardening leading to potential fatigue failure. This may be a particular consideration where the equipotential bonding element 58 has a length extending in the spanwise direction of the blade (as shown in FIG. 8), as these strains are greater than if the equipotential bonding element 58 extends in the blade chordwise direction. It should be noted that a chordwise extending equipotential bonding element 58 may be suitable where the stacks of fibre plies 70 are laid up spanwise rather than chordwise as shown in FIG. 5.

Where the equipotential bonding element 58 has a length extending in the spanwise direction of the blade, both the first and second metallic materials 59a, 59b need to be able to sustain the strains which act in the blade. The form of the first and second metallic materials 59a, 59b may have a springy or 'stretchy' design to reduce the strains taken up in the metallic materials. Therefore, 'stretchy' metal mesh, braided ribbons, or metal strands having a zig-zag path may be preferred to avoid the first and/or second metallic materials from taking up the full blade strains.

To accommodate the different yield strengths of the dissimilar first and second metallic materials 59a, 59b, the first and second metallic materials 59a, 59b may have different forms. The first metallic material 59a and the second metallic material 59b may each have a form configured to accommodate, without yielding, observed strains greater than the yield strength of a solid, straight form of the respective materials.

The equipotential bonding element 58 is an internal electric structure and may be located in one of the highest strain areas of the blade structure. It is important to avoid fatigue of the equipotential bonding element 58 as otherwise it could cause electrical arcing and impacts for the primary structure of the blade.

Figure 10:
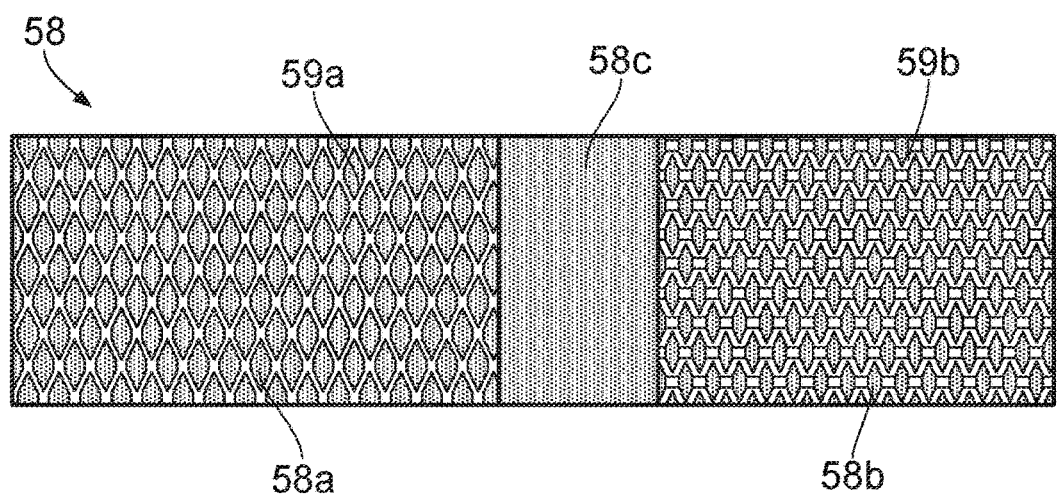
FIG. 10 shows another bimetallic equipotential bonding element.

FIG. 10 shows an example where the first metallic material 59a has a lower Young's modulus than a Young's modulus of the second metallic material 59b, and where a mesh pattern of the first metallic material 59a has a higher aspect ratio of the mesh apertures (or 'eyes') than an aspect ratio of the mesh pattern of the second metallic material 59b. The aspect ratio is taken as the width/length of the aperture 'eyes' in the strip (equipotential bonding element 58) width and length directions.

In one example, the first metallic material 59a comprises stretchy aluminium mesh with an aperture 'eye' aspect ratio (AR) of 0.5, and the second metallic material 59b comprises stretchy copper mesh with AR of 0.4. The smaller the aspect ratio is, the less stiffness the mesh has in the direction of the minor axis (i.e. the length dimension of the equipotential bonding element 58). The metal mesh can also take more strain in this direction without fatigue. The aluminium has lower Young's modulus than copper. The E-modulus for aluminium is around 70 GPA and 125 GPa for copper. In blades the strains can reach 4000 microstrain, which applied to aluminium is giving a stress of 280 MPa and applied to copper 500 MPa. Such stresses would be far too high for these metals in solid form (i.e. without apertures). By providing the metallic materials 59a, 59b as a stretchy mesh or foil and then tailoring the AR of the aperture 'eye's of the mesh to the specific materials selected, the form of the metallic materials allows to prevent the metal from seeing the full amounts of strains and therefore lower stresses.

The orientation of the mesh aperture eye aspect ratio may need to accommodate the spanwise blade strains if the equipotential bonding element 58 is oriented spanwise rather than chordwise, i.e. where the stacks of fibre plies 70 are laid up spanwise rather than chordwise.

For simplicity of manufacturing, it may be desirable that both the first and second metallic materials 59a, 59b have the same form, e.g. both are 'stretchy' mesh with the same AR but dissimilar metallic materials. For example, if aluminium and copper are selected as before then the lower AR of 0.4 could be chosen for both the first and second metallic materials 59a, 59b.

Looking now to the electrical connection between the first and second metallic materials 59a, 59b in the intermediate portion 58c, the electrical joint may be formed by soldering or casting. At least one of the first and second metallic materials 59a, 59b may need to be treated for soldering. For example, aluminium mesh should be treated for soldering. Zinc coated aluminium is readily solderable. Copper is readily solderable. Tinning the copper may provide additional corrosion protection. The treatment may be applied only at the end of the first or second metallic materials 59a, 59b nearest the joint. However, it may also be desirable to apply the treatment to the end of the second metallic material 59b adjacent the second conductive material. The treatment may be applied for whole areas of both the first and second metallic materials 59a, 59b.

As an alternative to solder, a casting (e.g. tin or zinc) can be used to connect the first and second metallic materials 59a, 59b in the intermediate portion 58c.

For soldering aluminium and copper, exemplary solders may be a 98% Zinc/2% AL alloy or 88AL/12Si alloy. The zinc alloy solder may provide good strength as the melting point (of around 420 degrees C.) is furthest away from the melting point of the aluminium mesh and so the solder process has less risk for overheating the aluminium. The aluminium alloy solder may provide a good corrosion resistant joint but has a higher melting point of around 577 degrees C. Both solders provide acceptable galvanic response and are relatively corrosion resistant.

A further suitable solder may be 78% Zn/22% Al. This product has a low melting point and so it may be particularly suitable for soldering the mesh. The mesh has thin sections with large surfaces and is hence easy to overheat, so the low melting point alloy is preferred. Flux residues may need to be removed before encapsulating the joint.

The solder metal may be chosen to provide good mechanical and electrical strength. The solder itself is not especially sensitive to galvanic corrosion as it will reside within the insulator 59c.

To ease the joining of the first and second metallic materials 59a, 59b in the intermediate portion 58c, the joint may not be mesh to mesh, but plate to plate. The mesh is created from a plate material and the starting point can have a portion of plate before the mesh is formed.

FIG. 11 shows an example where the first metallic material 59a is formed as a mesh, except for an end region at the intermediate portion 58c which is formed as a plate strip 59d. Similarly, the second metallic material 59b is formed as a mesh, except for an end region at the intermediate portion 58c which is formed as a plate strip 59d. Having the plate strip on the ends of both the first and second metallic materials 59a, 59b allows the joint to be plate to plate.

FIG. 12 A) shows a side view of an example joint between the first and second metallic materials 59a, 59b in the intermediate portion 58c, with the plate strip 59c of the first metallic material 59a simply overlapping the plate strip 59d of the second metallic material 59b to form a lap joint ready for soldering or casting or otherwise joining the first and second metallic materials 59a, 59b.

FIG. 12 B) shows an alternative side view of another example joint between the first and second metallic materials 59a, 59b in the intermediate portion 58c, in which each of the plate strips 59c and 59d are bent over to form a return or 'hook'. The hook on the plate strip 59c of the first metallic material 59a is mechanically engaged with the oppositely handed hook on the plate strip 59d of the second metallic material 59b to form a double hook joint ready for soldering or casting or otherwise joining the first and second metallic materials 59a, 59b.

FIGS. 12 C) and 13 A) and B) illustrate a further alternative example joint between the first and second metallic materials 59a, 59b in the intermediate portion 58c. Whilst once again the first metallic material 59a is formed as a mesh, except for an end region at the intermediate portion 58c which is formed as a plate strip 59e; and the second metallic material 59b is formed as a mesh, except for an end region at the intermediate portion 58c which is formed as a plate strip 59f; the plates 59e and 59f differ in that they feature respective tabs 59g and slots 59h. As shown in FIG. 13A), the plate strips 59e and 59f are initially substantially planar prior to forming the joint. The plate strip 59e has at least one tab 59g projecting from the edge nearest the plate strip 59f, and the plate strip 59f has at least one corresponding slot 59h sized to receive the respective tab 59g. During formation of the joint, the tab(s) 59g are received through the slot(s) 59h and then bent over to form a return or 'hook'. The completed single hook joint is shown in FIG. 13 B) and a side view is shown in FIG. 12 C), ready for soldering or casting or otherwise joining the first and second metallic materials 59a, 59b.

FIG. 14 illustrates a yet further alternative example joint between the first and second metallic materials 59a, 59b in the intermediate portion 58c where the joint is mesh to mesh, without any end plates. The mesh of one of the first and second metallic materials is cut through the 'eye' to provide a forked barb that will fit through the 'eye' of the other mesh material. The two mesh materials are brought together to provide an overlap region 59i, e.g. of approximately 3 tessellated rows of eyes, and then the forked barb 59j of the one mesh is passed through the eye of the other mesh material and bent over to form a return or 'hook' that secures around a node between adjacent eyes of the one mesh. The overlap may be important as the extent of the barb alone may provide insufficient land (i.e. the metal around the eyes) for soldering. Preferably the AR and pitch of the two meshes is the same to increase the overlapping land of the two meshes. Once the return is formed the joint is ready for soldering or casting or otherwise joining the first and second metallic materials 59a, 59b.

In each case-lap joint, double hook joint or single hook joint—the joint is based on soldering or casting the metals together for full mechanical and electric contact. The lap joint of FIG. 12A) is the simplest and should be clamped during soldering or casting. The double hook joint of FIG. 12 B) can hold itself together during soldering or casting and requires a forming tool to bend the returns. The single hooked joint of FIG. 12 C) requires punching tools and can hold itself together. The mesh to mesh joint of FIG. 14 with equal aperture pitch can be positioned on each other to allow soldering, which allow strips to be made without solid plate ends. The absence of plate ends may also provide less stiffness increase and hence may be less sensitive to suffer fatigue from strain peaks due to stiffness jumps.

Preferably, the length of the joint area should be as short as possible. This may help reduce the strain peaks, e.g. at the transitions from plate to mesh. The length of the joint area may be approximately 10 mm. Pads of glass fibre reinforcement may be added to provide some strain relief across the joint area.

Figure 15:
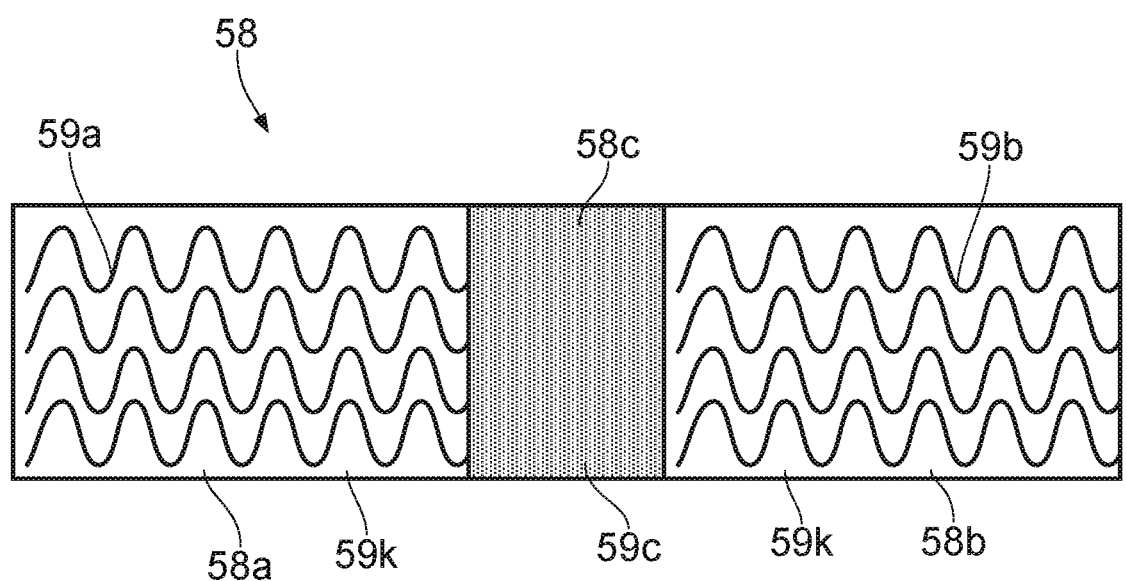
FIG. 15 shows another bimetallic equipotential bonding element.

FIG. 15 shows a further example of the equipotential bonding element 58 to be used in exactly the same way as in the examples described above. The equipotential bonding element 58 shown has a first end portion 58a adjacent the first conductive material of the lightning conductor e.g. metallic foil 32, a second end portion 58b opposite the first end portion and adjacent the second conductive material of the spar cap 46, and an intermediate portion 58c. The first end portion 58a has a first metallic material 59a, and the second end portion 58b has a second metallic material 59c. The first metallic material is joined to the second metallic material at a joint within the intermediate portion 58c. An insulator 59c encapsulates the joint for preventing exposure of the joint to an electrolyte material. The key difference over the previously described examples is that the first and/or second metallic materials are provided as strands rather than mesh.

The metallic strands may be provided on a substrate 59k, e.g. a fabric material, in particular glass fibre fabric, so that it can be incorporated into the glass fibre fabric plies in the stack 70 without the use of additional components and will infuse with resin without voids during manufacture of the blade shell 40. The metallic strands may be stitched onto the surface of the substrate 59k. The equipotential bonding element 58 is provided as a strip or ribbon in the same way as in the previously described examples. The materials selection for the first and second metallic materials 59a, 59b may be the same as described previously.

The metallic strands may have an undulating form, e.g. a zig zag pattern, across the surface of the substrate 59k with a pitch extending generally in the length dimension of the equipotential bonding element 58. The undulations in the metallic strands can accommodate the blade strains, as described previously, without deterioration due to fatigue as the pitch of the undulations can lengthen and shorten as the blade strains accompanied by a corresponding increase or decrease in the amplitude of the undulations. The nominal pitch of the undulations may be selected such that under maximum expected strain, the strands do not deform such that the strands straighten and become excessively strained in the straightened state, as otherwise they would then observe the full blade strains and fatigue of the strands may occur. The nominal pitch of the undulating strands of the first metallic material may be different than a pitch of the undulating strands of the second metallic material. This differential pitch may be selected based on the materials selection of the first and second metallic materials.

Although the invention has been described above with reference to one or more preferred embodiments, it will be appreciated that various changes or modifications may be made without departing from the scope of the invention as defined in the appended claims.

The invention claimed is:

1. A wind turbine rotor blade portion having a root end and a tip end, comprising:
    a wind turbine blade shell that defines a suction side, pressure side, leading edge, and a trailing edge of the blade portion, wherein the blade shell includes a lightning conductor including a first conductive material; and
    at least one spar cap associated with the blade shell and including a second conductive material different than the first conductive material;
    an equipotential bonding element electrically bonding the lightning conductor to the spar cap, wherein the equipotential bonding element includes:
        a first end portion having a first metallic material adjacent the first conductive material of the lightning conductor,
        a second end portion opposite the first end portion and having a second metallic material adjacent the second conductive material of the spar cap, and
        an intermediate portion where the first metallic material is joined to the second metallic material at a joint and having an insulator encapsulating the joint for preventing exposure of the joint to an electrolyte material.

2. The wind turbine rotor blade according to claim 1, wherein the first metallic material and the second metallic material are mechanically and electrically joined together at the joint.

3. The wind turbine rotor blade according to claim 1, wherein the equipotential bonding element is formed as a strip or ribbon.

4. The wind turbine rotor blade according to claim 1, wherein the first metallic material and the second metallic material each have a form configured to accommodate, without yielding, observed strains greater than the yield strength of a solid, straight form of the respective materials.

5. The wind turbine rotor blade according to claim 4, wherein the first metallic material has a different form to the second metallic material.

6. The wind turbine rotor blade according to claim 1, wherein the first metallic material and/or the second metallic material are formed as apertured foil or mesh.

7. The wind turbine rotor blade according to claim 5, wherein an aspect ratio of the apertures of the first metallic material are different than an aspect ratio of the apertures of the second metallic material.

8. The wind turbine rotor blade according to claim 1, wherein the first metallic material and/or the second metallic material are formed as strands on a substrate.

9. The wind turbine rotor blade according to claim 8, wherein the strands have an undulating form with undulations in a plane parallel to the substrate, and wherein a pitch of the undulating strands of the first metallic material are different than a pitch of the undulating strands of the second metallic material.

10. The wind turbine rotor blade according to claim 1, wherein the blade shell includes a plurality of stacks of fibre plies, and wherein the equipotential bonding element extends between an edge of one stack and an edge of an adjacent stack which overlap to define an overlapping edge region extending across the spar cap.

11. The wind turbine rotor blade according to claim 10, wherein the intermediate portion of the equipotential bonding element is in the overlapping region away from the spar cap and the lightning conductor.

12. The wind turbine rotor blade according to claim 10, wherein each stack of fibre plies has an inboard edge towards the root end of the blade, an outboard edge towards the tip end of the blade, a forward edge towards the leading edge of the blade, and a rear edge towards the trailing edge of the blade, and wherein the equipotential bonding element extends between an outboard edge of one stack and an inboard edge of an adjacent stack which overlap.

13. The wind turbine rotor blade according to claim 1, wherein the first end portion of the equipotential bonding element is attached to and in electrical contact with the lightning conductor, and the second end portion of the equipotential bonding element is attached to and in electrical contact with the spar cap.

14. The wind turbine rotor blade according to claim 1, wherein the first metallic material has a standard electrode potential similar to that of the first conductive material of the lightning conductor, and wherein the second metallic material has a standard electrode potential similar to that of the second conductive material of the spar cap.

15. The wind turbine rotor blade according to claim 1, wherein the lightning conductor is a metallic foil of a lightning protection system.

16. A method of manufacturing a wind turbine rotor blade portion having a root end and a tip end, comprising:
   laying up a shell of a wind turbine rotor blade that defines a suction side, pressure side, leading edge, and a trailing edge of the blade portion, the shell including a lightning conductor including a first conductive material;
   laying up a spar cap such that the lightning conductor extends over the spar cap, wherein the spar cap includes a second conductive material; and
   providing an equipotential bonding element to electrically bond the lightning conductor to the spar cap, the equipotential bonding element including:
      a first end portion having a first metallic material adjacent the first conductive material of the lightning conductor,
      a second end portion opposite the first end portion and having a second metallic material adjacent the second conductive material of the spar cap, and
      an intermediate portion where the first metallic material is joined to the second metallic material at a joint and having an insulator encapsulating the joint for preventing exposure of the joint to an electrolyte material.

* * * * *